Patented July 28, 1936

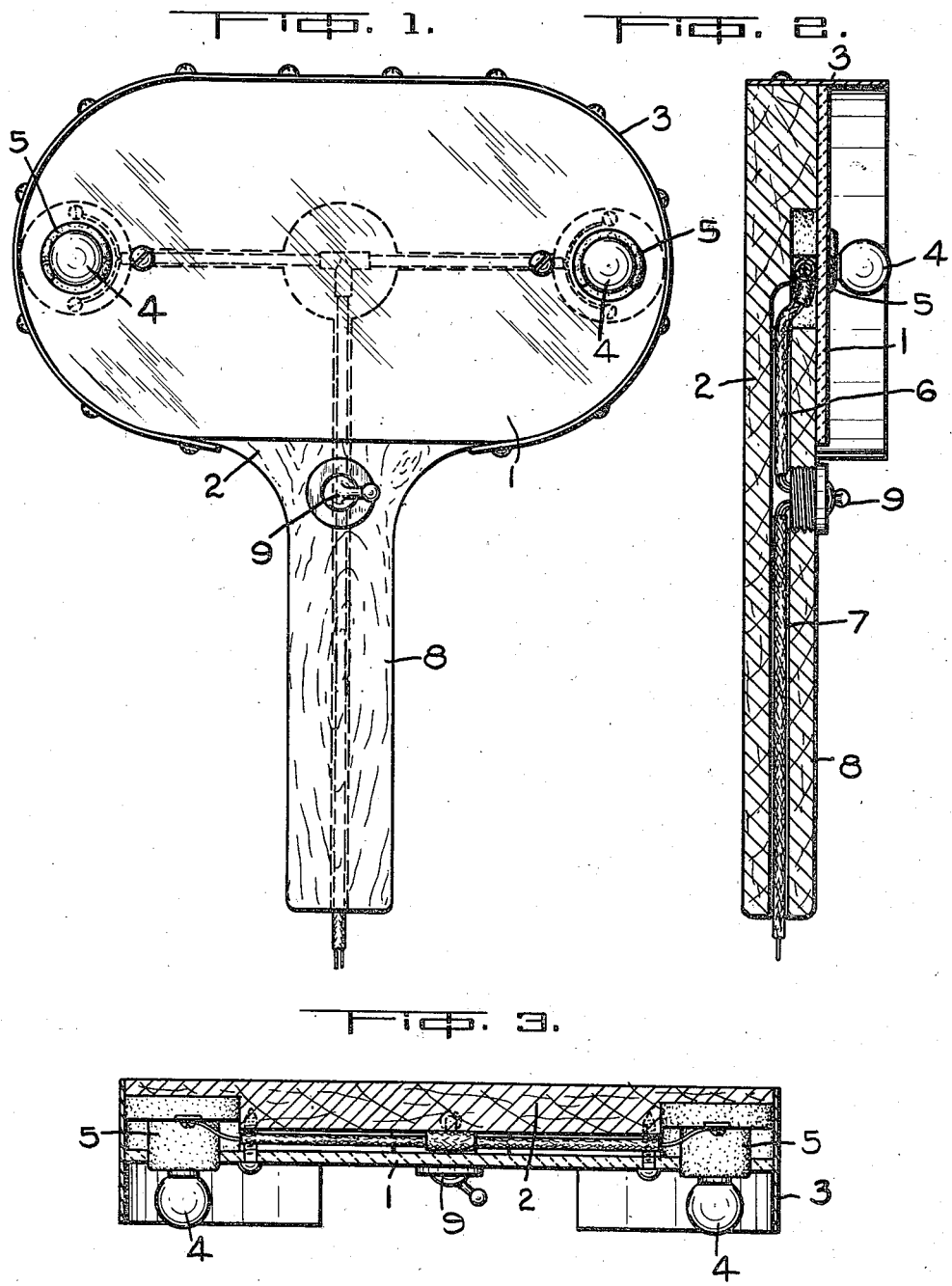

2,048,939

UNITED STATES PATENT OFFICE 2,048,939

LIGHTED MIRROR

Robert Leathorn, London, Ontario, Canada

Application August 26, 1935, Serial No. 37,859

3 Claims. (Cl. 240—4.2)

My invention relates to improvements in lighted mirrors more particularly adapted for automobile use, and the object of the invention is to devise a mirror which may not only be utilized to reflect the face of the person but also to light up the countenance and be particularly adapted for ladies' use which is so often desirable in connection with motor trips.

My invention consists of a mirror preferably of substantially oval form provided with an encompassing reflecting band supported on a suitable base provided with a suitable handle and incandescent lights suitably socketed and projecting forwardly from the surface of the mirror, such lights being provided with leading in wires extending through the base and the handle having a suitable switch, as hereinafter more particularly explained.

Fig. 1 is a face view of my lighted mirror.

Fig. 2 is a longitudinal section.

Fig. 3 is a cross section showing the location of the lights, sockets and wiring.

In the drawing like characters of reference indicate corresponding parts.

1 is the mirror which is of a substantially shaped elongated oval form. The mirror 1 is secured suitably to a base or backing 2 and is surrounded by an encompassing band 3 secured in place by screws or otherwise and projecting forwardly of the mirror. This band 3 has a reflecting surface so that not only may the mirror be utilized for a direct reflection but the band will serve to light the countenance directly but also to reflect the light from all sides and completely light up the countenance as will hereinafter appear.

In order to light up the mirror I provide preferably incandescent lights 4 which are held in the sockets 5 in the usual way. The sockets 5 are located at each end of the mirror and project therethrough so that the incandescent lights or lamps project forwardly of the mirror and light the surface thereof. The lamps are connected by the usual leading in wires 6 extending through orifices in the base or backing 2 designated 7. The lower portion of the leading in wires extend through the handle 8 and is provided with a suitable switch 9.

Having now described the principal parts involved in my invention, I will briefly describe its utility.

It is well known to motorists and especially ladies the advantage of having a mirror especially after a long trip when they desire to doll up before alighting from the car. The leading in wires of the mirror may be very conveniently connected to the battery of the car and the mirror may not only be used for the face of the person but it may also be utilized in some cases where it is difficult to see the mechanism of the car where it may need repairing.

I wish it to be understood also that my lighted mirror may be made of various forms and could be used as a wall mirror for household use. In fact, the mirror may be employed and devised in various forms for various purposes without departing from my invention.

What I claim as my invention is:—

1. A lighted mirror comprising the mirror proper, incandescent lamps and sockets therefor extending through suitable orifices in the mirror and extending forwardly of the face thereof, a backing to which the mirror is affixed, and an encompassing reflecting band fastened to the back and extending at right angles thereto and leading in wires extending to the incandescent lamps.

2. A lighted mirror comprising the laterally elongated mirror proper, incandescent lamps and sockets therefor extending through suitable orifices in the mirror and extending forwardly of the face towards each end thereof, a backing to which the mirror is affixed, and an encompassing reflecting band extending at right angles to the surface of the mirror and leading in wires extending to the incandescent lamps, the backing being provided with a suitable handle through which the main leading in wire extends, and a switch located in the handle in the wire circuit.

3. A lighted mirror comprising the laterally elongated mirror proper, incandescent lamps and sockets therefor extending through suitable orifices in the mirror and extending forwardly of the face towards each end thereof, a backing to which the mirror is affixed, and an encompassing reflecting band extending at right angles to the surface of the mirror and a leading in wire extending to the incandescent lamps, and a downwardly extending handle the leading in wire extending therethrough and branched at the top so as to extend to the lamps between the backing and the mirror.

ROBERT LEATHORN.